(12) United States Patent
Jeloyan et al.

(10) Patent No.: US 10,667,296 B2
(45) Date of Patent: May 26, 2020

(54) METHOD OF SENDING A MESSAGE AFTER LISTENING TO A COMMUNICATION CHANNEL SHARED BY TERMINALS

(71) Applicant: SIGFOX, Labege (FR)

(72) Inventors: Christophe Jeloyan, Toulouse (FR); Lionel Bertaux, Revel (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/066,290

(22) PCT Filed: Dec. 27, 2016

(86) PCT No.: PCT/EP2016/082712
§ 371 (c)(1),
(2) Date: Jun. 26, 2018

(87) PCT Pub. No.: WO2017/114830
PCT Pub. Date: Jul. 6, 2017

(65) Prior Publication Data
US 2019/0007970 A1   Jan. 3, 2019

(30) Foreign Application Priority Data
Dec. 28, 2015   (FR) ...................... 15 63386

(51) Int. Cl.
*H04W 74/08* (2009.01)
*H04W 16/14* (2009.01)
(Continued)

(52) U.S. Cl.
CPC ....... *H04W 74/0808* (2013.01); *H04W 16/14* (2013.01); *H04W 48/16* (2013.01);
(Continued)

(58) Field of Classification Search
CPC ............. H04W 16/14; H04W 74/0808; H04W 72/0453; H04W 48/16; H04W 72/121; H04W 72/1205; H04W 88/023
(Continued)

(56) References Cited

U.S. PATENT DOCUMENTS

2015/0124785 A1   5/2015 Merlin et al.
2017/0013481 A1*  1/2017 Wang ...................... H04W 4/70
(Continued)

FOREIGN PATENT DOCUMENTS

WO   2012/040520 A1   3/2012

OTHER PUBLICATIONS

Part 11: Wireless LAN Medium Access Control (MAC) and Physical Layer (PHY) Specifications, IEEE STD 802.11-2012, Apr. 18, 2012, pp. 1-9, vol. 802.11, IEEE Computer Society, Piscataway, NJ, USA.
(Continued)

*Primary Examiner* — Rownak Islam
(74) *Attorney, Agent, or Firm* — Im IP Law; Chai Im; C. Andrew Im (57) ABSTRACT

A method of transmitting, by a terminal of a wireless communication system, a message on a communication channel shared with other terminals. Before sending the message, the terminal listens on the communication channel until the terminal detects an absence of activity on the communication channel for an inactivity time ΔTin. When no activity is detected on the communication channel for the inactivity time ΔTin, the terminal waits for a waiting time ΔTat and then transmits the message on the communication channel. The waiting time ΔTat is identical for all of the terminals of the wireless communication system.

11 Claims, 3 Drawing Sheets

(51) Int. Cl.
*H04W 48/16* (2009.01)
*H04W 72/04* (2009.01)
*H04W 72/12* (2009.01)
*H04W 88/02* (2009.01)

(52) U.S. Cl.
CPC ... *H04W 72/0453* (2013.01); *H04W 72/1205* (2013.01); *H04W 88/023* (2013.01); *H04W 72/121* (2013.01)

(58) Field of Classification Search
USPC .......................................................... 370/329
See application file for complete search history.

(56) References Cited

U.S. PATENT DOCUMENTS

2018/0234965 A1* 8/2018 Ahn .................. H04W 74/0816
2018/0279366 A1* 9/2018 Harada ............. H04W 72/0446

OTHER PUBLICATIONS

"ETSI EN 301 893 v1.8.1: Broadband Radio Access Networks (BRAN); 5 GHz high performance RLAN; Harmonized EN covering the essential requirements of article 3.2 of the R&TTE Directive," Mar. 20, 2015, pp. 1-93, ETSI, http://www.etsi.org/deliver/etsi_en/301800_301899/301893/01.08.01_60/en_301893v010801p.pdf.

* cited by examiner

METHOD OF SENDING A MESSAGE AFTER LISTENING TO A COMMUNICATION CHANNEL SHARED BY TERMINALS

RELATED APPLICATIONS

This application is a § 371 application from PCT/EP2016/082712 filed Dec. 27, 2016, which claims priority from French Patent Application No. 15 63386 filed Dec. 28, 2015, each of which is incorporated herein by reference in its entirety.

TECHNICAL FIELD

This invention relates to the field of wireless communication systems. More particularly, this invention relates to a method of sending a message by a terminal, in the case where the message has to be sent on a communication channel shared with other terminals, and in the case where each terminal has to check the availability of said communication channel before sending a message.

BACKGROUND OF THE INVENTION

In many wireless communication systems, it is indeed necessary to listen to the communication channel, in order to check the availability of it, before sending a message on said communication channel.

This is the case in particular for wireless communication systems that use so called unlicensed frequency bands in that they can be used without any prior administrative authorisation, as long as the regulatory constraints are complied with. These regulatory constraints comprise indeed, in certain geographical zones, the obligation to listen before talking (LBT).

In such wireless communication systems, it is therefore possible to send a message only if no activity has been detected on said communication channel for a predetermined time, termed the "inactivity time". For example, in Japan, the inactivity time to be detected before sending a message must be at least 5 milliseconds (ms).

In the current wireless communication systems, a terminal that wishes to send a message on such a communication channel therefore begins by listening to said communication channel. If the communication channel is busy, or if an activity is detected before said inactivity time was able to be observed, the terminal can immediately interrupt the listening, and try later to listen to said communication channel after expiration of a predetermined time, termed the "listening delay time". The terminal can also prolong the listening until it detects an absence of activity on the communication channel during said inactivity time. As soon as an absence of activity for a time equal to said inactivity time has been detected, the terminal can send the message.

Using unlicensed frequency bands is particularly advantageous in the case of applications of the M2M ("Machine-to-Machine") type or of the "Internet of Things" (IoT) type, as it makes it possible to reduce the costs of such wireless communication systems.

In the context for example of the IoT, each object of everyday life has a vocation of becoming a communicating device, and is to this effect equipped with a terminal suitable for sending messages intended for an access network. As such, in such a context, it is entirely possible that a very large number of terminals, typically greater than 100 and even more, share the same communication channel.

A problem with known techniques of listening before sending resides in the fact that, in the case of a large number of terminals sharing the same communication channel, it can be difficult to access the communication channel. Indeed, the probability of having a terminal that sends a message at the instant when another terminal is listening to the communication channel increases with the number of terminals, in such a way that the terminals spend a lot of time waiting for the communication channel to be free.

Furthermore, the fact that it is sufficient that at least one terminal is sending a message in the communication channel so that the latter is considered as busy, independently of the possible faculty of the terminals to use said communication channel without interfering between them, leads to a use that is not very effective of said communication channel.

OBJECT AND SUMMARY OF THE INVENTION

This invention has for objective to overcome all or a portion of the limitations of the solutions of prior art, in particular those mentioned hereinabove, by proposing a solution that makes it possible to improve the effectiveness of use of a communication channel shared by a large number of terminals, in the case where a terminal has to listen to the communication channel before sending.

To this effect, and according to a first aspect, the invention relates to a method of sending, by a terminal of a wireless communication system, a message on a communication channel shared with other terminals, said method comprising:

before sending said message: a step of listening without interrupting the communication channel by said terminal until it detects an absence of activity on the communication channel for a predetermined time, termed the "inactivity time $\Delta Tin$", when no activity is detected on said communication channel for the inactivity time $\Delta Tin$: a step of sending said message on the communication channel.

Furthermore, the terminals are frequency multiplexed and/or by different spreading codes on said communication channel and, after having detected an absence of activity on the communication channel during the inactivity time $\Delta Tin$, said method comprises a step of waiting, for an identical predetermined time for all of the terminals of the wireless communication system, termed the "waiting time $\Delta Tat$", before sending the message.

As such, contrary to certain techniques of listening of prior art, the terminal, when it is listening to the communication channel, does not interrupt the listening if an activity is detected on said communication channel. On the contrary, the terminal prolongs the listening although the communication channel is busy, until detecting an absence of activity on said communication channel of a duration equal to said inactivity time $\Delta Tin$, in such a way that the listening time is then greater than the inactivity time $\Delta Tin$.

Consequently, when the communication channel is initially busy, prolonging the listening makes it possible to detect the instant of the end of the activity in progress on said communication channel, and therefore to detect as early as possible, after the end of the activity in progress, an absence of activity of a duration equal to the inactivity time $\Delta Tin$.

The method of sending therefore makes it possible to improve the effectiveness of using the communication channel thanks to the fact that it is possible to send a message as close as possible to the end of the activity on the communication channel, while still complying with the constraint of detecting beforehand an absence of activity of a duration equal to the inactivity time ΔTin.

The effectiveness in using the communication channel is also improved by the fact that the terminals that have a message to be sent will tend to simultaneously send their respective messages, since on the one hand they will detect the end of activity at substantially the same instant, in such a way that they will also detect an absence of activity of a duration equal to the inactivity time ΔTin substantially at the same time, and on the other hand the waiting time ΔTat is identical for all of the terminals of the communication system. However, as the terminals are multiplexed in frequency and/or by different spreading codes on said communication channel, no collision occurs and the messages sent simultaneously by said terminals do not interfere with each other.

Delaying the sending of the message by a time equal to the waiting time ΔTat is advantageous as this makes it possible to increase the number of terminals that can send, and as such to further favour the simultaneous sending of messages by different terminals.

The waiting time ΔTat is identical for all of the terminals of the communication system as it does not aim to spread out the sending of messages of the different terminals over time, but to favour the simultaneous sending of messages by a larger number of terminals.

Another advantage of using the waiting time ΔTat is that it makes it possible to correct a problem linked to the propagation times which has it that the terminal that is the closest to the terminal that is occupying the communication channel will tend to detect first that the channel is free and could potentially prevent the other terminals from sending.

Consequently, the method of sending makes it possible to comply with the listening constraint before sending while still optimising the occupation of said communication channel by favouring the simultaneous sending of several messages.

In particular embodiments, the method of sending can comprise furthermore one or several of the following characteristics, taken individually or according to any technically possible combinations.

In particular embodiments, the terminal interrupts the listening of the communication channel when no absence of activity of a duration equal to the inactivity time ΔTin is detected for a predetermined time, termed the "maximum listening time ΔTmax", the maximum listening time ΔTmax being substantially greater than the inactivity time ΔTin, i.e. the maximum listening time ΔTmax is at least five times greater than the inactivity time ΔTin (ΔTmax≥5·ΔTin), and preferably at least ten times greater than said inactivity time ΔTin (ΔTmax≥10·ΔTin).

As such, if during the step of listening, no absence of activity of a duration equal to the inactivity time ΔTin is detected during the maximum listening time ΔTmax, the terminal finally interrupts the listening. Such arrangements make it possible in particular to avoid constantly listening to the communication channel in the case where the latter would be constantly occupied by a source of interference that does not comply with the regulatory constraints.

In particular embodiments, the maximum listening time ΔTmax is greater than a maximum duration ΔTmsg of the messages sent by the terminals of the wireless communication system, and more preferably ΔTmax is greater than (ΔTmsg+2×ΔTin+ΔTat).

In particular embodiments, the maximum listening time ΔTmax is greater than or equal to 2 seconds.

In particular embodiments, the waiting time ΔTat is greater than or equal to the inactivity time ΔTin.

In particular embodiments, the message to be sent by the terminal is an ultra-narrow band message.

In particular embodiments, the sending of the message comprises a random selection, by said terminal, of a central frequency for sending said message inside a frequency band shared with the other terminals.

In particular embodiments, the sending of the message comprises the spreading of the spectrum of said message by means of a predetermined spreading code.

According to a second aspect, this invention relates to a terminal of a wireless communication system, comprising means configured to implement the steps of a method of sending according to any of the embodiments of the invention.

According to a third aspect, this invention relates to a wireless communication system comprising a plurality of terminals according to any of the embodiments of the invention.

In particular embodiments, the wireless communication system comprises an access network comprising a plurality of base stations, with the communication channel corresponding to an uplink from the terminals to said access network.

BRIEF DESCRIPTION OF THE DRAWINGS

The invention shall be understood better when reading the following description, given by way of an example that is in no way limiting, and made in reference to the figures which show.

In these figures, references that are identical from one figure to another designate identical or similar elements. For reasons of clarity, the elements shown are not to scale, unless mentioned otherwise.

DETAILED DESCRIPTION OF EMBODIMENTS

Figure 1:
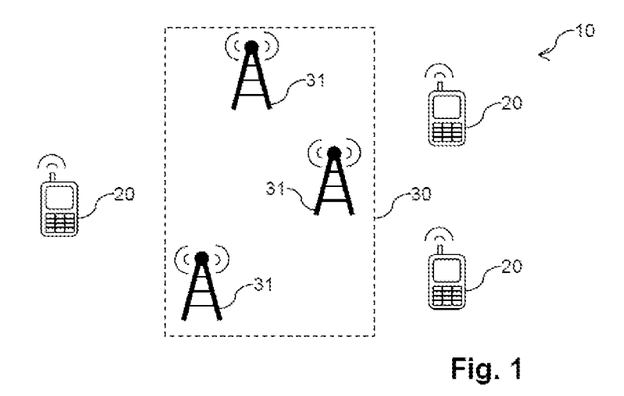
FIG. 1: a diagrammatical representation of an embodiment of a wireless communication system.

FIG. 1 diagrammatically shows an embodiment of a wireless communication system 10. In the example shown in FIG. 1, the wireless communication system 10 comprises several terminals 20 and an access network 30 comprising a plurality of base stations 31.

The terminals 20 and the base stations 31 of the access network 30 exchange data in the form of radio signals. The term "radio signal" means an electromagnetic wave propagating via wireless means, of which the frequencies are within the traditional spectrum of radio waves (a few hertz to several hundred gigahertz).

In the rest of the description, consider in a non-limiting manner the case where the data exchanges between the terminals 20 and the base stations 31 are substantially unidirectional, here on an uplink from the terminals 20 to the access network 30. Nothing excludes however, according to other examples, having a two-directional wireless communication system 10, wherein it is also possible to have data exchanges on a downlink from the access network 30 to the terminals 20.

The uplink between the terminals 20 and the base stations 31 of the access network 30 corresponds to a communication channel shared by said terminals 20. More particularly, the communication channel corresponds to a predetermined frequency band, for example with a width equal to 200 kilohertz (kHz), wherein each terminal 20 is authorised to send a message comprising data.

In the rest of the description, consider in a non-limiting manner the case where the terminals 20 are multiplexed in frequencies on the communication channel ("Frequency Division Multiple Access" or FDMA).

Furthermore, consider in a non-limiting manner the case where the wireless communication system 10 is an ultra-narrow band. The term ultra-narrow band (UNB) means that the instantaneous frequency spectrum of the messages sent by the terminals 20 is of a frequency width less than two kilohertz, even less than one kilohertz. The sending of such messages can be carried out with a highly reduced electrical consumption, particularly suitable for applications of the M2M or IoT type.

In addition, such ultra-narrow band messages lend themselves particularly well to a multiplexing in frequencies of the different terminals 20 on the communication channel.

For example, it is possible to associate beforehand, a central frequency for sending messages to each terminal 20, with the respective central sending frequencies of the different terminals 20 being different from each other and invariant over time. For example, if the communication channel corresponds to a frequency band with a width equal to 200 kHz, it is possible, in the case of ultra-narrow band messages, to multiplex between 100 and 200 terminals 20 in said frequency band, without the messages sent by said terminals 20 interfering with each other.

Alternatively, in preferred embodiments, each terminal 20 of the wireless communication system 10 is configured to select, randomly, a central frequency for sending the message to be sent, inside the shared frequency band. Consequently, the central frequency for sending, for the same terminal 20, varies over time, more preferably each time that a message has to be sent.

Such arrangements are advantageous in that they make it possible to statistically carry out, without coordination between the terminals 20 and the base stations 31 of the access network 30, a frequency multiplexing of the terminals 20 on the communication channel. The complexity lies however on the access network 30, which has to be capable of receiving sent messages, on said communication channel, on arbitrary central sending frequencies that are a priori not known to the access network 30.

Furthermore, due to the fact that the central frequency for sending of each terminal 20 varies over time, the communication between each terminal 20 and the access network 30 is less sensitive to the presence of a source of interference sending a parasite signal on a central sending frequency that is invariant over time, and which occupies only a portion of the frequency band shared by said terminals 20.

Figure 2:
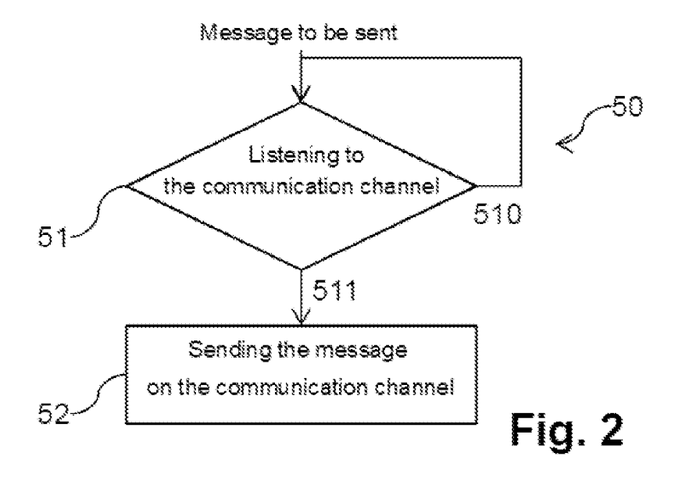
FIG. 2: a diagram showing an example embodiment of a method of sending.

FIG. 2 diagrammatically shows the main steps of a method 50 for sending a message on the communication channel shared by the different terminals 20 of the wireless communication system 10.

The method 50 of sending is implemented by each terminal 20 of said wireless communication system 10.

To this effect, each terminal 20 comprises in particular a control unit (not shown in the figures), comprising for example one or several processors and means for memorising (magnetic hard drive, electronic memory, optical disc, etc.) wherein is memorised a computer program product, in the form of a set of program code instructions to be executed in order to implement the different steps of the method 50 of sending.

Alternatively or as a complement, the control unit comprises one or several programmable logic circuits (FPGA, PLD, etc.), and/or one or several specialised integrated circuits (ASIC), and/or a set of discrete electronic components, etc., suitable for implementing all or a portion of the steps of the method 50 of sending.

Each terminal 20 furthermore comprises means of wireless communication, considered as known to those skilled in the art, that allow said terminal to send uplink messages intended for the base stations 31 of the access network 30.

In other terms, the terminal 20 comprises a set of means configured by software (specific computer program product) and/or by hardware (FPGA, PLD, ASIC, discrete electronic components, etc.) to implement the steps of the method 50 of sending.

Such as indicated hereinabove, before sending a message on the communication channel, a terminal 20 has to listen to said communication channel in order to check that it is not busy.

As such, such as shown in FIG. 2, when the terminal 20 has a message to be sent, the method 50 of sending comprises, before sending said message, a step 51 of listening to the communication channel by said terminal 20.

The communication channel is considered as not being occupied if no activity is detected on said communication channel for a predetermined time, termed the "inactivity time $\Delta Tin$". The inactivity time $\Delta Tin$ can in particular depend on the regulatory constraints in effect in the geographical zone covered by the wireless communication system 10, and is for example greater than or equal to 5 ms.

The term "activity on the communication channel" means a sending in progress of a message by another terminal 20 of the wireless communication system 10, as well as a sending by a third-party piece of equipment, that does not belong to said wireless communication system 10. Note that any method for detecting activity known to those skilled in the art can be implemented, and the choice of a particular method forms only an alternative embodiment of the invention.

If, during the step 51 of listening, an activity is detected before being able to detect an absence of activity, on said communication channel, of a duration equal to said inactivity time $\Delta Tin$ (reference 510 in FIG. 2), then the execution of the step 51 of listening continues.

However, if an absence of activity of a duration equal to the inactivity time $\Delta Tin$ is detected (reference 511 in FIG. 2), then the communication channel is considered as not being occupied. The method 50 of sending then comprises a step 52 of sending said message.

In other terms, the terminal 20 listens to the communication channel without interruption until detecting an absence of activity on said communication channel of a duration equal to said inactivity time $\Delta Tin$.

If, when a terminal 20 has to send a message and begins to listen to the communication channel, an activity is detected on the communication channel, then the terminal 20 will listen to the communication channel until the instant of the end of the activity in progress on said communication channel. As such, the terminal 20 will be able to send as close as possible to the instant of the end of activity since the measurement of the inactivity time ΔTin starts immediately after the activity in progress on the communication channel has stopped.

Furthermore, such a behaviour of terminals 20 will make it possible to favour the simultaneous sending of several messages, by different terminals 20, after an activity in progress on the communication channel has stopped. Indeed, terminals 20 that have a message to be sent and which begin to listen to the communication channel during the same period of activity on the communication channel, will begin the measurement of the inactivity time ΔTin substantially at the same instant, immediately after the activity in progress on the communication channel has stopped. Given that the terminals 20 are, in the example considered, multiplexed in frequencies, the messages sent simultaneously do not interfere with each other.

Figure 3:
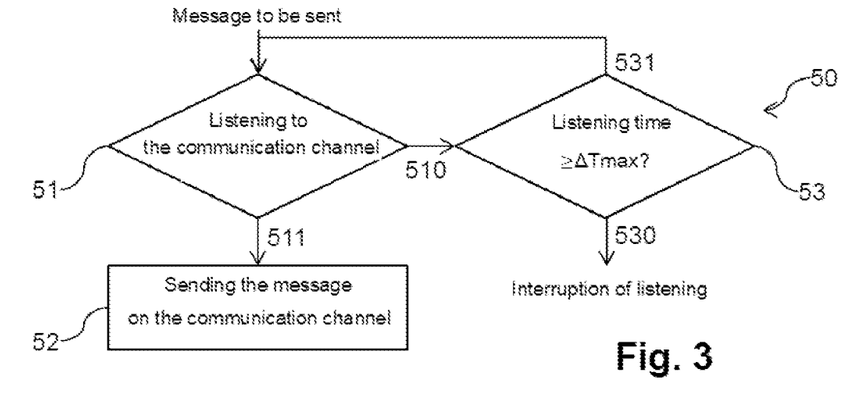
FIG. 3: a diagram showing an alternative embodiment of a method of sending.

FIG. 3 diagrammatically shows the main steps of an alternative implementation of a method 50 of sending.

In addition to the steps described in reference to FIG. 2, the method 50 of sending comprises a step 53 of determining if the duration of listening to the communication channel has exceeded a predetermined time, termed the "maximum listening time ΔTmax".

If the listening time has exceeded the maximum listening time ΔTmax without detecting an absence of activity of a duration equal to the inactivity time ΔTin (reference 530 in FIG. 3) then the terminal 20 interrupts the listening of the communication channel. In such a case, the terminal 20 can later try to listen to the communication channel, for example after expiration of a predetermined time, termed the "listening delay time ΔTr". The listening delay time ΔTr is for example between a few hundred milliseconds and a few seconds. Furthermore, it is also possible to cancel the sending of the message after a predefined number of interrupted listenings, or at the expiration of a predetermined maximum duration, for example of about a few hundred seconds.

However, if the listening time has not exceeded the maximum listening time ΔTmax (reference 531 in FIG. 3), the listening of the communication channel continues without interruption.

In other terms, the terminal 20 listens to the communication channel, without interruption, as long as no absence of activity of a duration equal to the inactivity time ΔTin has been detected, up to the limit however that the listening time cannot exceed the maximum listening time ΔTmax. Such arrangements make it possible in particular to avoid constantly listening to the communication channel in the case where the latter would be constantly occupied by a source of interference that does not comply with the regulatory constraints.

More preferably, the maximum listening time ΔTmax is significantly greater than the inactivity time ΔTin, i.e. at least five times greater than said inactivity time ΔTin.

Indeed, the more substantial the maximum listening time ΔTmax is, the more it will be possible, for a large number of terminals 20 that have a message to be sent, to detect the instant of the end of an activity in progress on the communication channel. Consequently, the more the maximum listening time ΔTmax increases, the more substantial the number of terminals 20 that can simultaneously send messages is. In the case where the inactivity time ΔTin is equal to 5 ms, the maximum listening time is for example greater than or equal to 500 ms, even greater than or equal to 2 seconds.

In preferred embodiments, the maximum listening time ΔTmax is greater than a maximum duration ΔTmsg of the messages sent by the terminals 20 of the wireless communication system, and more preferably ΔTmax is greater than (ΔTmsg+2×ΔTin+ΔTat). In such a case, each terminal 20 will still listen to the communication channel long enough to detect an absence of activity of a duration equal to the inactivity time ΔTin after an activity in progress, if however, this activity corresponds to a message sent by a terminal 20 of said wireless communication system 10.

Figure 4:
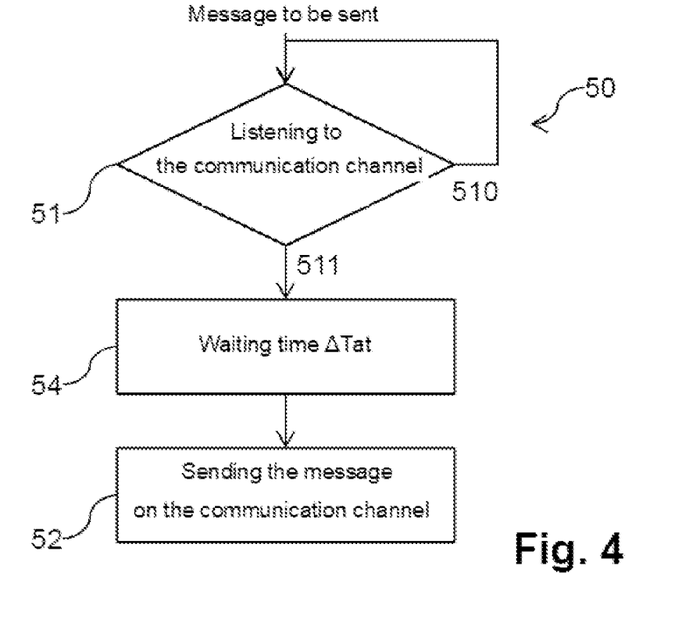
FIG. 4: a diagram showing a preferred embodiment of a method of sending.

FIG. 4 diagrammatically shows the main steps of a preferred embodiment of a method 50 of sending.

Such as shown in FIG. 4, the method 50 of sending includes the steps described in reference to FIG. 2. In the non-limiting example shown in FIG. 4, the method 50 of sending does not include the step 53, described in reference to FIG. 3, of determining if the listening time has exceeded the maximum listening time ΔTmax. Nothing excludes however, according to other examples, also including the step 53 of determining if the listening time has exceeded the maximum listening time ΔTmax.

Such as shown in FIG. 4, the method 50 of sending comprises, after having detected an absence of activity on the communication channel of a duration equal to the inactivity time ΔTin, a step 54 of waiting, for a predetermined time, termed the "waiting time ΔTat", before sending the message.

In other terms, after having detected an absence of activity on the communication channel of a duration equal to the inactivity time ΔTin, the terminal 20 delays the sending of the message by a duration equal to the waiting time ΔTat.

Such arrangements are advantageous in that they make it possible to further favour the simultaneous sending of messages by different terminals 20. Indeed, a terminal 20 that has begun to listen to the communication channel while an activity was in progress will tend to send its message at an instant that corresponds to:

$$Tfin + \Delta Tin + \Delta Tat$$

expression wherein Tfin correspond to the instant of the end of the activity detected by said terminal 20. Consequently, a terminal 20 that would begin to listen between the instant Tfin and the instant (Tfin+ΔTat) can detect an absence of activity of a duration equal to the inactivity time ΔTin, and trigger the sending of a message, which would not have been the case if the terminal 20, which began to listen to the communication channel while an activity was in progress, were to send its message directly at the instant (Tfin+ΔTin).

Note that the waiting time ΔTat only aims to delay the sending of the message, said sending having been decided at the instant Tfin. As such, an activity that would begin after the instant Tfin does not call into question the sending of the message by the terminal 20, in such a way that it is not necessary to listen to the communication channel after the instant Tfin and during the waiting time ΔTat.

Advantageously, the waiting time ΔTat is the same for all of the terminals 20 of the wireless communication system 10. Indeed, the waiting time ΔTat does not aim to spread out the sendings of messages of the different terminals 20 over time, in order to prevent the latter from being sent simultaneously. The waiting time ΔTat aims solely to extend the inactivity on the communication channel in order to favour the simultaneous sending of messages by a larger number of terminals 20. For example, the waiting time ΔTat is greater than or equal to the inactivity time ΔTin.

Another advantage of using the waiting time ΔTat is that it makes it possible to correct a problem linked to the propagation times which has it that the terminal that is the closest to the terminal that is occupying the communication channel will tend to detect first that the channel is free and could potentially prevent other terminals from sending. Indeed, without the waiting time ΔTat, the closest terminal could potentially begin to send, and therefore occupy the communication channel, before even another more distant terminal could have detected an absence of activity of a duration equal to the inactivity time ΔTin, which would prevent this other terminal from being able to send at the same time as the closest terminal.

Figure 5:
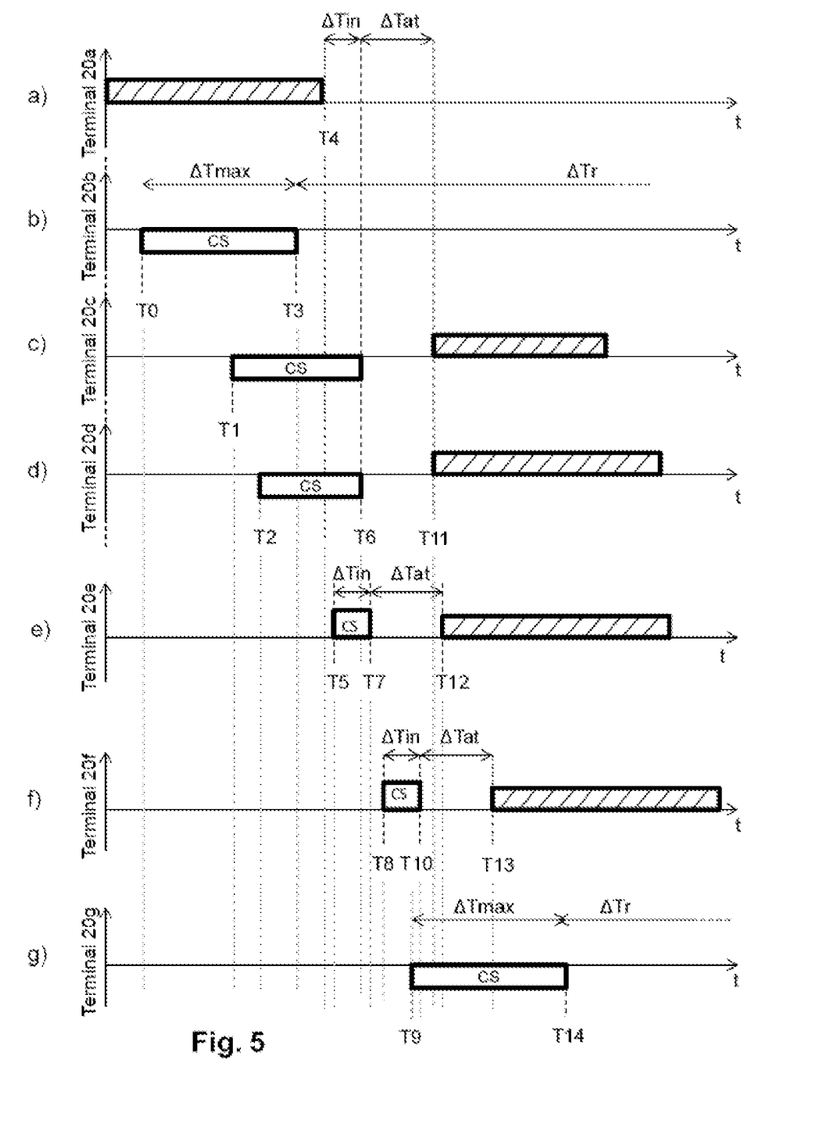
FIG. 5: temporal diagrams showing the operation of a method of sending according to the invention.

FIG. 5 shows temporal diagrams illustrating the operating principle of a method 50 of sending. In the example shown in FIG. 5, consider in a non-limiting manner the case where the listening time is limited to the maximum listening time ΔTmax, and where each terminal 20 sends after having detected an absence of activity of a duration equal to the inactivity time ΔTin and after having waited for an additional time equal to the waiting time ΔTat.

More particularly, FIG. 5 comprises seven parts, from a) to g), which show the behaviours of seven terminals 20a to 20g. For each one of these terminals, a hashed zone corresponds to a time interval for sending a message, and a zone designated by "CS" corresponds to a time interval of listening to the communication channel.

Such as shown in part a) of FIG. 5, consider in a non-limiting manner the case where the terminal 20a is initially in the process of sending a message on the communication channel, and the sending of the message by the terminal 20a ends at an instant T4.

Such as shown in part b) of FIG. 5, at an instant T0 less than T4, the terminal 20b begins to listen to the communication channel for the purpose of sending a message. At an instant T3, which corresponds to (T0+ΔTmax) and which is less than T4, the terminal 20b interrupts the listening of the communication channel, which is still occupied by the terminal 20a. For example, the terminal 20b can try to again listen to the communication channel after expiration of the listening delay time ΔTr.

Such as shown in part c) of FIG. 5, the terminal 20c begins to listen to the communication channel, for the purpose of sending a message, at an instant T1. The instant T1 is such that (T1+ΔTmax) is greater than (T4+ΔTin), in such a way that the terminal 20c detects the end of the activity on the communication channel at the instant T4, and an absence of activity of duration ΔTin at an instant T6 which corresponds to (T4+ΔTin). The terminal 20c begins to send its message starting from the instant T11 (T6+ΔTat).

Such as shown in part d) of FIG. 5, the terminal 20d begins to listen to the communication channel, for the purpose of sending a message, at an instant T2 (T2>T1). The instant T2 is such that (T2+ΔTmax) is greater than (T4+ΔTin), in such a way that the terminal 20d detects the end of the activity on the communication channel at the instant T4, and an absence of activity of duration ΔTin at the instant T6. Like the terminal 20c, the terminal 20d begins to send its message starting from the instant T11 (T6+ΔTat).

Such as shown in part e) of FIG. 5, the terminal 20e begins to listen to the communication channel, for the purpose of sending a message, at an instant T5 (T4<T5<T6). The instant T5 is such that (T5+ΔTin) is less than T11 and less than (T5+ΔTmax), in such a way that the terminal 20e detects an absence of activity of duration ΔTin at the instant T7 (T5+ΔTin). The terminal 20e begins to send its message starting from the instant T12 (T7+ΔTat).

Such as shown in part f) of FIG. 5, the terminal 20f begins to listen to the communication channel, for the purpose of sending a message, at an instant T8 (T6<T8<T11). The instant T8 is such that (T8+ΔTin) is less than T11 and less than (T8+ΔTmax), in such a way that the terminal 20f detects an absence of activity of duration ΔTin at the instant T10 (T8+ΔTin). The terminal 20f begins to send its message starting from the instant T13 (T10+ΔTat).

Such as shown in part g) of FIG. 5, the terminal 20g begins to listen to the communication channel, for the purpose of sending a message, at an instant T9 (T9<T11). The instant T9 is such that (T9+ΔTin) is greater than T11. At an instant T14, which corresponds to (T9+ΔTmax), the terminal 20g did not succeed in detecting an absence of activity of duration ΔTin and it interrupts the listening of the communication channel. For example, the terminal 20g can try to again listen to the communication channel after expiration of the listening delay time ΔTr. Note that, if the value of ΔTmax had been chosen greater than (ΔTmsg+2× ΔTin+ΔTat), then the terminal 20g would have been able to send its message as close as possible to the end of the sending of the terminal 20f.

As such, such as shown in FIG. 5, the terminals 20c and 20d send their message simultaneously. Furthermore, the terminals 20e and 20f send their message practically simultaneously in relation to the terminals 20c and 20d, which would not have been the case without using the waiting time ΔTat. Given that the terminals 20a to 20g are, in the example considered, multiplexed in frequencies, the messages sent simultaneously do not interfere with each other. It is therefore understood that the method 50 of sending makes it possible to improve the effectiveness of the use of the communication channel while still complying with the listening constraint before sending.

Such an improvement is obtained in part thanks to the fact that the terminals 20, when they detect an activity on the communication channel, persist in listening to the communication channel until detecting an absence of activity of a duration equal to the inactivity time ΔTin.

Such an operation can, in certain cases, be accompanied by an electrical consumption of the terminals 20 according to the invention that is more substantial than the electrical consumption of the terminals that interrupt their listening of the communication channel as soon as an activity is detected. However, the inventors have observed that, when the number of terminals is substantial, the electrical consumption of the terminals 20 according to the invention (with listening without interruption) is reduced on the average in relation to that of terminals that conduct a listening with interruption. Indeed, in the case of a large number of terminals, the terminals that conduct a listening with interruption tend to interrupt the listening of the communication channel much more often and to try to listen again many times after having waited for the listening delay time. With a large number of terminals, the total listening time required for a terminal that conducts listening with interruption to send a message tends to be higher than the listening time required in the case of the invention, since the terminals 20 according to the invention tend to listen to a single time the communication channel, for a listening time that is generally less than the maximum duration of the messages sent by said terminals 20.

More generally, note that the embodiments considered have been described by way of non-limiting examples, and that other alternatives can consequently be considered.

In particular, the invention has been described by considering mainly the case where the messages sent by the terminals 20 are of ultra-narrow band, which is particularly advantageous for applications of the M2M or IoT type.

Nothing excludes however, according to other examples, considering the sending of messages that would not be of ultra-narrow band.

Furthermore, the invention has been described by considering mainly a frequency multiplexing of the terminals 20 on the communication channel. Nothing excludes however, according to other examples, considering other techniques of multiplexing the terminals 20 on the communication channel, alternatively or as a complement to the frequency multiplexing. In particular, the invention is also applicable to the case where the terminals 20 are multiplexed by different spreading codes ("Code Division Multiple Access" or CDMA). In such a case, the sending of a message by a terminal 20 comprises the spreading of the spectrum of said message by means of a predetermined spreading code for said terminal 20, separate from the spreading codes of the other terminals 20 of the wireless communication system 10. The spreading codes considered are for example M-sequences, Gold sequences, etc.

The invention has also been described by considering the case where the communication channel corresponds to the uplink between terminals 20 and an access network 30. Nothing excludes however, according to other examples, considering another communication channel, such as for example a communication channel used by the terminals 20 to communicate directly between them, without having to pass through an access network.

The invention claimed is:

1. A method of transmitting, by a terminal of a wireless communication system, a message on a communication channel shared with other terminals, the method comprising:
   before sending the message, listening without interruption to the communication channel by the terminal until the terminal detects an absence of activity on the communication channel for an inactivity time $\Delta Tin$;
   wherein a plurality of terminals is multiplexed at least in one of frequency and by different spreading codes on the communication channel;
   waiting for a waiting time $\Delta Tat$ before transmitting the message on the communication channel by the terminal in response to the detection of an absence of activity on the communication channel for the inactivity time $\Delta Tin$, the waiting time $\Delta Tat$ being identical and fixed for all of said plurality of terminals of the wireless communication system to favor simultaneous sending of messages by different terminals; and
   interrupting the listening of the communication channel by the terminal in response to a detection of an activity of a duration equal to the inactivity time $\Delta Tin$ for a maximum listening time $\Delta Tmax$, the maximum listening time $\Delta Tmax$ being greater than the inactivity time $\Delta Tin$ and greater than a maximum duration of the messages sent by said plurality of terminals of the wireless communication system.

2. The method according to claim 1, wherein the maximum listening time $\Delta Tmax$ is greater than or equal to 2 seconds.

3. The method according to claim 1, wherein the waiting time $\Delta Tat$ is greater than or equal to the inactivity time $\Delta Tin$.

4. The method according to claim 1, wherein the message transmitted by the terminal is an ultra-narrow band message.

5. The method according to claim 1, wherein the method of transmitting the message comprises a step of randomly selecting, by the terminal, of a central frequency for transmitting the message inside a frequency band shared with the other terminals.

6. The method according to claim 1, wherein the method of transmitting the message comprises a step of spreading a spectrum of the message with a predetermined spreading code.

7. A terminal of a wireless communication system comprising a controller configured to perform the method according to claim 1 for transmitting a message on a communication channel shared with other terminals.

8. The terminal according to claim 7, wherein the controller comprises one or more processors.

9. The terminal according to claim 7, wherein the controller comprises one or more programmable logic circuits.

10. A system for wireless communication comprising a plurality of terminals according to claim 7.

11. The system according to claim 10, further comprising an access network comprising a plurality of base stations; and wherein the communication channel corresponds to an uplink from said plurality of the terminals to the access network.

* * * * *